(12) United States Patent
Koh et al.

(10) Patent No.: US 9,240,616 B2
(45) Date of Patent: Jan. 19, 2016

(54) SOLVENT INCLUDING 1,2-DIALKYL-1,2-DIFLUOROETHYLENE CARBONATE FOR NON-AQUEOUS ELECTROLYTIC SOLUTION OF LITHIUM SECONDARY BATTERY

(75) Inventors: Meiten Koh, Settsu (JP); Hideo Sakata, Settus (JP); Hitomi Nakazawa, Settsu (JP); Akiyoshi Yamauchi, Settsu (JP); Akinori Tani, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 475 days.

(21) Appl. No.: 12/864,926

(22) PCT Filed: Jan. 22, 2009

(86) PCT No.: PCT/JP2009/050963
§ 371 (c)(1),
(2), (4) Date: Jul. 28, 2010

(87) PCT Pub. No.: WO2009/096307
PCT Pub. Date: Aug. 6, 2009

(65) Prior Publication Data
US 2011/0008682 A1 Jan. 13, 2011

(30) Foreign Application Priority Data

Jan. 29, 2008 (JP) ................................ 2008-017751
Jun. 5, 2008 (JP) ................................ 2008-147912

(51) Int. Cl.
*H01M 10/0569* (2010.01)
*H01M 10/0525* (2010.01)

(52) U.S. Cl.
CPC ...... *H01M 10/0569* (2013.01); *H01M 10/0525* (2013.01); *Y02E 60/122* (2013.01); *Y02T 10/7011* (2013.01)

(58) Field of Classification Search
CPC .................... H01M 10/052; H01M 10/0569
USPC .......................................................... 429/332
See application file for complete search history.

(56) References Cited

U.S. PATENT DOCUMENTS

2006/0134528 A1   6/2006   Ihara et al.
2007/0292764 A1   12/2007  Soma et al.
(Continued)

FOREIGN PATENT DOCUMENTS

JP        7-240232 A    9/1995
JP        8-306364 A    11/1996
(Continued)

OTHER PUBLICATIONS

Kamisori et al., Machine translation of JP 2004-319317 A, Nov. 2004.*

(Continued)

*Primary Examiner* — Sean P Cullen
(74) *Attorney, Agent, or Firm* — Sughrue Mion, PLLC (57) ABSTRACT

A solvent for non-aqueous electrolytic solution of lithium secondary battery including a non-fluorine-containing cyclic carbonate (I), a non-fluorine-containing chain carbonate (II) and 1,2-dialkyl-1,2-difluoroethylene carbonate (III). When the total amount of (I), (II) and (III) is taken as 100% by volume, the non-fluorine-containing cyclic carbonate (I) is contained in an amount of 10 to 50% by volume, the non-fluorine-containing chain carbonate (II) is contained in an amount of 49.9 to 89.9% by volume and the 1,2-dialkyl-1,2-difluoroethylene carbonate (III) is contained in an amount of not less than 0.1% by volume and less than 30% by volume. A non-aqueous electrolytic solution including the above-mentioned solvent and a lithium secondary battery using the non-aqueous electrolytic solution are also disclosed.

9 Claims, 4 Drawing Sheets

(56) References Cited

U.S. PATENT DOCUMENTS

2009/0092892 A1* 4/2009 Yamaguchi et al. .......... 429/125
2009/0253048 A1 10/2009 Shima

FOREIGN PATENT DOCUMENTS

| JP | 2003-168480 A | 6/2003 |
| JP | 2004-241339 A | 8/2004 |
| JP | 2004-319317 A | 11/2004 |
| JP | 2006-190635 A | 7/2006 |
| JP | 2007-188873 A | 7/2007 |
| JP | 2007-305381 A | 11/2007 |
| JP | 2007-305381 A | 11/2007 |
| JP | 2007-335331 A | 12/2007 |
| JP | 2007-335406 A | 12/2007 |
| JP | 2008-004535 A | 1/2008 |
| JP | 2008-4535 A | 1/2008 |
| WO | 2006132372 A1 | 12/2006 |
| WO | WO 2007136046 A1 * | 11/2007 |

OTHER PUBLICATIONS

Shima, N., Machine translation of JP 2007-305381 A, Nov. 2007.*

* cited by examiner

SOLVENT INCLUDING 1,2-DIALKYL-1,2-DIFLUOROETHYLENE CARBONATE FOR NON-AQUEOUS ELECTROLYTIC SOLUTION OF LITHIUM SECONDARY BATTERY

TECHNICAL FIELD

The present invention relates to a solvent for non-aqueous electrolytic solution of lithium secondary battery, a non-aqueous electrolytic solution comprising the solvent and a lithium secondary battery using the non-aqueous electrolytic solution.

BACKGROUND ART

More and more rigorous demands for characteristics of non-aqueous electrolytic solution of lithium secondary battery have been imposed year by year. One of such demands is to solve a problem that metal is precipitated in the form of dendrite on a protective film formed on a metal surface of a negative electrode, thereby causing lowering of rate characteristic and cycle characteristic of a battery in some cases, and in the worst case, there is a danger that dendrite reaches a positive electrode surface, resulting in short circuit and firing.

In order to solve such a problem, there is proposed a method of fluorinating ethylene carbonate being a good solvent for dissolving an electrolyte salt for inhibiting formation of dendrite and improving cycle characteristic (JP7-240232A, JP2003-168480A, JP2004-319317A, JP2007-188873A and JP8-306364A).

Fluorination of ethylene carbonate has been shifted from monofluorination to difluorination for enhancing ability of forming a film (protective film) (JP7-240232A, JP2003-168480A and JP2004-319317A).

However, difluoroethylene carbonate is instable and high in hydrolyzability and accordingly is difficult to use, and synthesis and refining of it is difficult. Also, there is little difference in ability of film formation between difluoroethylene carbonate and monofluoroethylene carbonate. Therefore, the use of difluoroethylene carbonate has not proceeded.

Fluorination of substituted ethylene carbonate is also disclosed (JP2007-188873A and JP8-306364A). In JP2007-188873A, a variety of general formulas are proposed and a lot of compounds are raised as examples thereof, but fluorinated ethylene carbonates actually used in examples are only monofluoroethylene carbonates and difluoroethylene carbonates similar to those of JP7-240232A, JP2003-168480A and JP2004-319317A.

In JP8-306364A, fluoroethylene carbonate having methyl as a substituent is disclosed and is said to have an effect of inhibiting formation of dendrite. However, even in JP8-306364A, fluorinated ethylene carbonate actually used in examples is only one which is 1-methyl-2,2-difluoroethylene carbonate. Also, fluorinated ethylene carbonate is contained in an amount of as much as not less than 10% by volume, preferably not less than 30% by volume.

DISCLOSURE OF INVENTION

It is an object of the present invention to provide a solvent for non-aqueous electrolytic solution of lithium secondary battery which provides a lithium secondary battery having specifically excellent discharge capacity, rate characteristic, cycle characteristic and safety, a non-aqueous electrolytic solution comprising the solvent and a lithium secondary battery using the non-aqueous electrolytic solution.

The present invention relates to a solvent for non-aqueous electrolytic solution of lithium secondary battery comprising a non-fluorine-containing cyclic carbonate (I), a non-fluorine-containing chain carbonate (II) and 1,2-dialkyl-1,2-difluoroethylene carbonate (III), and assuming that the total amount of (I), (II) and (III) is 100% by volume, the non-fluorine-containing cyclic carbonate (I) is contained in an amount of from 10 to 50% by volume, the non-fluorine-containing chain carbonate (II) is contained in an amount of from 49.9 to 89.9% by volume and the 1,2-dialkyl-1,2-difluoroethylene carbonate (III) is contained in an amount of not less than 0.1% by volume and less than 30% by volume.

The non-fluorine-containing cyclic carbonate (I) is preferably one of ethylene carbonate and propylene carbonate or a mixture thereof from the viewpoint of good cycle characteristic.

The non-fluorine-containing chain carbonate (II) is preferably one of dimethyl carbonate, methyl ethyl carbonate and diethyl carbonate or a mixture thereof from the viewpoint of good rate characteristic.

Also, the 1,2-dialkyl-1,2-difluoroethylene carbonate (III) is preferably 1,2-dimethyl-1,2-difluoroethylene carbonate from the viewpoint of low viscosity.

There are trans-form and cis-form of 1,2-dialkyl-1,2-difluoroethylene carbonate (III), and both of them exhibit an effect of decreasing resistance and an effect of improving safety due to an effect in film formation on an electrode.

With respect to the proportions of (I), (II) and (III), it is preferable, from the viewpoint of good low-temperature characteristic, that assuming that the total amount of (I), (II) and (III) is 100% by volume, the non-fluorine-containing cyclic carbonate (I) is contained in an amount of from 10 to 40% by volume, the non-fluorine-containing chain carbonate (II) is contained in an amount of from 59.9 to 89.9% by volume and the 1,2-dialkyl-1,2-difluoroethylene carbonate (III) is contained in an amount of not less than 0.1% by volume and less than 10% by volume.

The present invention also relates to a non-aqueous electrolytic solution of lithium secondary battery comprising the mentioned solvent for non-aqueous electrolytic solution and an electrolyte salt.

The present invention further relates to a lithium secondary battery using the non-aqueous electrolytic solution of the present invention.

EXPLANATION OF SYMBOLS

1 Positive electrode
2 Negative electrode
3 Separator
4 Terminal of positive electrode
5 Terminal of negative electrode
6 Aluminum-laminated casing

BEST MODE FOR CARRYING OUT THE INVENTION

The solvent for non-aqueous electrolytic solution of the present invention comprises the non-fluorine-containing cyclic carbonate (I), the non-fluorine-containing chain carbonate (II) and the 1,2-dialkyl-1,2-difluoroethylene carbonate (III) in a specific ratio.

Each component and proportions thereof are explained below.

(I) Non-Fluorine-Containing Cyclic Carbonate

Examples of the non-fluorine-containing cyclic carbonate (I) are one or more of ethylene carbonate, propylene carbonate, butylene carbonate, vinylethylene carbonate and the like. Among these, ethylene carbonate (EC) and propylene carbonate (PC) are high in dielectric constant and especially excellent in ability of dissolving an electrolyte salt and is preferred for the electrolytic solution of the present invention.

This non-fluorine-containing cyclic carbonate is excellent in ability of dissolving an electrolyte salt and has characteristics of improving rate characteristic and dielectric constant.

Also, vinylene carbonate can be blended as an additional (optional) component for improving cycle characteristic though discharge capacity is decreased. An amount thereof is desirably 0.1 to 10% by volume based on the whole electrolytic solution.

(II) Non-Fluorine-Containing Chain Carbonate

Examples of the non-fluorine-containing chain carbonate (II) are one or more of hydrocarbon chain carbonates such as $CH_3CH_2OCOOCH_2CH_3$ (diethyl carbonate: DEC), $CH_3CH_2OCOOCH_3$ (methyl ethyl carbonate: MEC), $CH_3OCOOCH_3$ (dimethyl carbonate: DMC) and $CH_3OCOOCH_2CH_2CH_3$ (methyl propyl carbonate). Among these, DEC, MEC and DMC are preferred from the viewpoint of low viscosity and good low-temperature characteristics.

(III) 1,2-dialkyl-1,2-difluoroethylene carbonate

This is encompassed in the category of fluorine-containing cyclic carbonates, and is ethylene carbonate in which the first position is substituted by fluorine atom and alkyl group and also the second position is substituted by fluorine atom and alkyl group. Alkyl groups of the first position and the second position may be the same or different. From the viewpoint of low viscosity, alkyl groups having 1 to 3 carbon atoms such as methyl, ethyl and propyl are preferred as an alkyl group.

Examples thereof are 1,2-dimethyl-1,2-difluoroethylene carbonate, 1,2-diethyl-1,2-difluoroethylene carbonate, 1-methyl-2-ethyl-1,2-difluoroethylene carbonate, and the like, and especially from the viewpoint of low viscosity, 1,2-dimethyl-1,2-difluoroethylene carbonate is preferred.

There are 1,2-dialkyl-1,2-difluoroethylene carbonates (III) of trans-form and cis-form, and the both exhibit an effect of decreasing resistance and an effect of improving safety due to an effect in film formation on an electrode. Oxidation potential of cis-form is higher than that of trans-form.

1,2-dialkyl-1,2-difluoroethylene carbonates (III) of trans-form and cis-form are novel compounds, and can be prepared, for example, by the following methods.

(1) Carbonyl difluoride is allowed to react with a diketone compound represented by the formula (1):

wherein $R^1$ and $R^2$ are the same or different and each is an alkyl group, in a solvent in the presence of a base to synthesize a mixture of cis-form and trans-form, and then separating cis-form and trans-form by fractional distillation.

(2) Dichlorinated carbonyl is allowed to react with the diketone compound represented by the formula (1) to synthesize 1,2-dialkyl-1,2-dichloroethylene carbonate. The obtained 1,2-dialkyl-1,2-dichloroethylene carbonate is formed into a trans-form due to steric hindrance of chlorine atom, and this trans-form is allowed to react with a fluorinating agent (potassium fluoride) or fluorine gas to obtain trans-1,2-dialkyl-1,2-difluoroethylene carbonate.

As compared with analogous fluorine-containing ethylene carbonates, for example, monofluoroethylene carbonates such as monofluoroethylene carbonate and dialkyl monofluoroethylene carbonate, this 1,2-dialkyl-1,2-difluoroethylene carbonate (III) exhibits effects of improving discharge capacity, rate characteristic and cycle characteristic of a lithium secondary battery and an effect of decreasing resistance, and is specifically excellent in improvement in safety due to an effect of formation of a film on an electrode. Also, as compared with other difluoroethylene carbonates such as difluoroethylene carbonate and difluoromonoalkylethylene carbonate, this 1,2-dialkyl-1,2-difluoroethylene carbonate is hardly hydrolyzed, exhibits effects of improving discharge capacity, rate characteristic and cycle characteristic of a lithium secondary battery and an effect of decreasing resistance, and is specifically excellent in safety due to an effect in film formation on an electrode. Among these, cis-1,2-dialkyl-1,2-difluoroethylene carbonate is most excellent since it gives large discharge capacity, good rate characteristic and cycle characteristic to a lithium secondary battery and also has a large effect in film formation on an electrode.

With respect to the proportions of (I), (II) and (III), assuming that the total amount of (I), (II) and (III) is 100% by volume, the non-fluorine-containing cyclic carbonate (I) is contained in an amount of from 10 to 50% by volume, the non-fluorine-containing chain carbonate (II) is contained in an amount of from 49.9 to 89.9% by volume and the 1,2-dialkyl-1,2-difluoroethylene carbonate (III) is contained in an amount of not less than 0.1% by volume and less than 30% by volume.

When the amount of non-fluorine-containing cyclic carbonate (I) is too large, compatibility with other components is lowered, and in some cases, phase separation from other components occurs under low temperature atmosphere (for example, from −30° C. to −20° C.) especially at an outside air temperature in wintertime and at an inside temperature of a refrigerator. From this point of view, a preferred upper limit of the amount is 35% by volume, further 30% by volume. On the contrary, when the amount is too small, solubility of an electrolyte salt in the whole solvent is lowered and a desired concentration of an electrolyte salt (0.8 mole/liter or more) cannot be achieved.

Also, the non-fluorine-containing cyclic carbonate (I) is contained in an amount smaller than that of the non-fluorine-containing chain carbonate (II) so that compatibility between each solvent component is not lowered. It is especially preferable that the total amount of non-fluorine-containing cyclic carbonate (I) and 1,2-dialkyl-1,2-difluoroethylene carbonate (III) is smaller than that of the non-fluorine-containing chain carbonate (II), from the viewpoint that since compatibility between each solvent component can be secured, a uniform electrolytic solution can be formed over a wide temperature range and further, rate characteristic and cycle characteristic of lithium secondary battery are improved.

The amount of 1,2-dialkyl-1,2-difluoroethylene carbonate (III) is less than 30% by volume. When the amount of component (III) is larger, discharge capacity tends to be lowered, and an allowable upper limit is lower than 30% by volume. The component (III) can exhibit its effect in a relatively small amount, and its amount is preferably less than 10% by volume. An effective lower limit is 0.1% by volume, further preferably 0.5% by volume.

It can be considered that the 1,2-dialkyl-1,2-difluoroethylene carbonate (III) helps to form a film of good quality especially on a negative electrode, and as a result, resistance is decreased. Accordingly, when a carbonaceous material such as graphite is used on a negative electrode, the amount of (III) is preferably 5% by volume or less. When an alloy material is used on a negative electrode, the amount of (III) is preferably less than 10% by volume because a film being thicker than a carbonaceous material is necessary.

From the viewpoint mentioned above, a preferred solvent for the non-aqueous electrolytic solution is one comprising 10 to 40% by volume of the non-fluorine-containing cyclic carbonate (I), 59.9 to 89.9% by volume of the non-fluorine-containing chain carbonate (II) and not less than 0.1% by volume and less than 10% by volume of the 1,2-dialkyl-1,2-difluoroethylene carbonate (III), assuming that the total amount of (I), (II) and (III) is 100% by volume.

The problem to be solved in the present invention can be solved by the solvent for non-aqueous electrolytic solution of the present invention comprising only the components (I), (II) and (III). To the solvent for non-aqueous electrolytic solution may be added other solvent known as a solvent for non-aqueous electrolytic solution in addition to the components (I), (II) and (III). It is necessary that kind and amount of such a solvent should be selected within a range not to cause hindrance in solving the problem to be solved in the present invention.

The present invention also relates to the electrolytic solution for lithium secondary battery comprising the solvent for non-aqueous electrolytic solution of the present invention and an electrolyte salt.

Examples of the electrolyte salt to be used for the non-aqueous electrolytic solution of the present invention are $LiClO_4$, $LiAsF_6$, $LiBF_4$, $LiPF_6$, $LiN(SO_2CF_3)_2$, $LiN(SO_2C_2F_5)_2$ and the like, and from the viewpoint of good cycle characteristic, $LiPF_6$, $LiBF_4$, $LiN(SO_2CF_3)_2$, $LiN(SO_2C_2F_5)_2$ and a combination thereof are preferred.

In order to secure practical performance of the lithium secondary battery, the concentration of the electrolyte salt of not less than 0.5 mole/liter, further not less than 0.8 mole/liter is demanded. An upper limit is usually 1.5 mole/liter. The solvent for dissolving an electrolyte salt of the present invention has ability of dissolving an electrolyte salt at a concentration satisfying these requirements.

To the non-aqueous electrolytic solution of the present invention may be added additives such as a flame retardant, a surfactant, an additive for increasing dielectric constant, cycle characteristic and rate characteristic improver and further an overcharging inhibitor for improvement of safety without deviation from the specified volume percentages of the components (I), (II) and (III) to an extent not to impair the effect of the present invention.

With respect to a flame retardant, known flame retardants can be used. Especially phosphoric ester may be added to impart noncombustibility (non-ignition property). Ignition can be prevented by mixing phosphoric ester in an amount of from 1 to 10% by volume based on the solvent for dissolving an electrolyte salt.

Examples of phosphoric ester are fluorine-containing alkylphosphoric ester, non-fluorine-containing alkylphosphoric ester and arylphosphoric ester, and fluorine-containing alkylphosphoric ester is preferred since it highly contributes to make the electrolytic solution nonflammable and an effect of making the electrolytic solution nonflammable is increased even if its amount is small.

Examples of fluorine-containing alkylphosphoric ester are fluorine-containing dialkylphosphoric esters disclosed in JP11-233141A, cyclic alkylphosphoric esters disclosed in JP11-283669A, and fluorine-containing trialkylphosphoric esters.

Since fluorine-containing trialkylphosphoric esters have high capability of giving noncombustibility and satisfactory compatibility with the components (I), (II) and (III), the amount thereof can be decreased, and even when the amount is from 1 to 8% by volume, further from 1 to 5% by volume, ignition can be prevented.

Preferred examples of fluorine-containing trialkylphosphoric esters are those represented by the formula: $(RfO)_3-P=O$, wherein Rf is $CF_3-$, $CF_3CF_2-$, $CF_3CH_2-$, $HCF_2CF_2-$ or $CF_3CFHCF_2-$. Especially, tri-2,2,3,3,3-pentafluoropropyl phosphate and tri-2,2,3,3-tetrafluoropropyl phosphate are preferred.

Further, fluorine-containing carbonate (other than the component (III)), fluorine-containing lactone and fluorine-containing sulfolane can be exemplified as a flame retardant. Examples of fluorine-containing carbonate as a flame retardant are fluorine-containing chain carbonates represented by:

wherein $R^1$ and $R^2$ are the same or different and each is an alkyl group which has 1 to 3 carbon atoms and may contain fluorine atom, at least either $R^1$ or $R^2$ contains fluorine atom, or
fluorine-containing cyclic carbonates (excluding the component (III)) represented by:

wherein Rf is a fluorine-containing alkyl group which has 1 to 9 carbon atoms and may have ether bond.

A surfactant may be added in order to improve capacity property and rate characteristic.

Any of cationic surfactants, anionic surfactants, nonionic surfactants and amphoteric surfactants may be used as a surfactant, and fluorine-containing surfactants are preferred from the viewpoint of good cycle characteristic and rate characteristic.

For example, there are preferably fluorine-containing carboxylates and fluorine-containing sulfonates.

Examples of fluorine-containing carboxylates are $HCF_2C_2F_6COO^-Li^+$, $C_4F_9COO^-Li^+$, $C_5F_{11}COO^-Li^+$, $C_6F_{13}COO^-Li^+$, $C_7F_{15}COO^-Li^+$, $C_8F_{17}COO^-Li^+$, $HCF_2C_2F_6COO^-NH_4^+$, $C_4F_9COO^-NH_4^+$, $C_5F_{11}COO^-NH_4^+$, $C_6F_{13}COO^-NH_4^+$, $C_7F_{15}COO^-NH_4^+$, $C_8F_{17}COO^-$ NH$_4^+$, HCF$_2$C$_2$F$_6$COO$^-$NH(CH$_3$)$_3^+$, C$_4$F$_9$COO$^-$NH(CH$_3$)$_3^+$, C$_5$F$_{11}$COO$^-$NH(CH$_3$)$_3^+$, C$_6$F$_{13}$COO$^-$NH(CH$_3$)$_3^+$, C$_7$F$_{15}$COO$^-$NH(CH$_3$)$_3^+$, C$_8$F$_{17}$COO$^-$NH(CH$_3$)$_3^+$, and the like. Examples of fluorine-containing sulfonates are C$_4$F$_9$SO$_3^-$Li$^+$, C$_6$F$_{13}$SO$_3^-$Li$^+$, C$_8$F$_{17}$SO$_3^-$Li$^+$, C$_4$F$_9$SO$_3^-$NH$_4^+$, C$_6$F$_{13}$SO$_3^-$NH$_4^+$, C$_8$F$_{17}$SO$_3^-$NH$_4^+$, C$_4$F$_9$SO$_3^-$NH(CH$_3$)$_3^+$, C$_6$F$_{13}$SO$_3^-$NH(CH$_3$)$_3^+$, C$_8$F$_{17}$SO$_3^-$NH(CH$_3$)$_3^+$, and the like.

The amount of surfactant is preferably from 0.01 to 2% by mass based on the whole solvents for dissolving the electrolyte salt from the viewpoint of decreasing a surface tension of the electrolytic solution without lowering charge-discharge cycle characteristic. Examples of an additive for increasing dielectric constant are sulfolane, methyl sulfolane, γ-butyrolactone, γ-valerolactone, acetonitrile, propionitrile and the like.

Examples of an overcharging inhibitor are hexafluorobenzene, fluorobenzene, cyclohexylbenzene, dichloroaniline, difluoroaniline, toluene, and the like.

For improving cycle characteristic, vinylene carbonate, 4-fluoroethylene carbonate and the like are effective though discharge capacity is decreased.

For improving rate characteristic, tetrahydrofuran, silicate compounds and the like are effective.

The present invention also relates to the lithium secondary battery using the non-aqueous electrolytic solution of the present invention. The lithium secondary battery of the present invention is provided with a positive electrode, a negative electrode, a separator and the electrolytic solution of the present invention, and it is especially preferable that an active material for the positive electrode to be used on the positive electrode is at least one selected from the group consisting of cobalt compound oxides, nickel compound oxides, manganese compound oxides, iron compound oxides and vanadium compound oxides, since a high output lithium secondary battery having high energy density is obtained.

Example of cobalt compound oxide is LiCoO$_2$, example of nickel compound oxide is LiNiO$_2$, and example of manganese compound oxide is LiMnO$_2$. Also, there may be used compound oxides of CoNi represented by LiCo$_x$Ni$_{1-x}$O$_2$ (0<x<1), compound oxides of CoMn represented by LiCo$_x$Mn$_{1-x}$O$_2$ (0<x<1), compound oxides of NiMn represented by LiNi$_x$Mn$_{1-x}$O$_2$ (0<x<1) and LiNi$_x$Mn$_{2-x}$O$_4$ (0<x<2) and compound oxides of NiCoMn represented by LiNi$_{1-x-y}$Co$_x$Mn$_y$O$_2$ (0<x<1, 0<y<1, 0<x+y<1). In these lithium-containing compound oxides, a part of metal elements such as Co, Ni and Mn may be replaced by at least one metal element such as Mg, Al, Zr, Ti or Cr.

Examples of iron compound oxide are LiFeO$_2$ and LiFePO$_4$, and example of vanadium compound oxide is V$_2$O$_5$.

Among the above-mentioned compound oxides, nickel compound oxides or cobalt compound oxides are preferred as an active material for a positive electrode from the viewpoint that capacity can be made high. Especially in a small size lithium ion secondary battery, the use of cobalt compound oxides is desirable from the viewpoint of high energy density and safety.

In the present invention, especially for the uses on large size lithium secondary batteries for hybrid cars and distributed power source, since high output is demanded, it is preferable that particles of an active material for a positive electrode mainly comprise secondary particles, and an average particle size of the secondary particles is not more than 40 μm and fine particles having an average primary particle size of not more than 1 μm are contained in an amount of from 0.5 to 7.0% by volume.

When fine particles having an average primary particle size of not more than 1 μm are contained, an area thereof coming into contact with an electrolytic solution is increased and lithium ion can be scattered more rapidly between the electrode and the electrolytic solution, thereby enabling output performance to be improved.

Examples of an active material to be used on a negative electrode in the present invention are carbon materials, and in addition, metallic oxides and metallic nitrides to which lithium ion can be inserted. Examples of carbon materials are natural graphite, artificial graphite, pyrocarbon, coke, mesocarbon microbeads, carbon fiber, activated carbon and pitch-coated graphite. Examples of metallic oxides to which lithium ion can be inserted are metallic compounds containing tin, silicon or titanium, for example, tin oxide, silicon oxide and lithium titanate, and examples of metallic nitrides are Li$_{2.6}$Co$_{0.4}$N, etc.

A separator which can be used in the present invention is not limited particularly, and there are exemplified microporous polyethylene films, microporous polypropylene films, microporous ethylene-propylene copolymer films, microporous polypropylene/polyethylene two-layer films, microporous polypropylene/polyethylene/polypropylene three-layer films, etc. Also, there are films prepared by coating aramid resin on a separator or films prepared by coating a resin comprising polyamide imide and alumina filler on a separator for the purpose of enhancing safety such as prevention of short-circuit due to Li dendrite (cf., for example, JP2007-299612A and JP2007-324073A).

The lithium secondary battery of the present invention are useful as a large size lithium secondary battery for hybrid cars and distributed power source, and in addition, are useful as a small size lithium secondary battery for mobile phone and portable remote terminal.

Example

The present invention is then explained by means of examples, but the present invention is not limited to them.

Compounds used in the following examples and comparative examples are as follows.

Component (I)
  (IA): Ethylene carbonate
  (IB): Propylene carbonate
Component (II)
  (IIA): Dimethyl carbonate
  (IIB): Methyl ethyl carbonate
  (IIC): Diethyl carbonate
Component (III)
  (IIIA): cis-1,2-dimethyl-1,2-difluoroethylene carbonate
  (IIIB): trans-1,2-dimethyl-1,2-difluoroethylene carbonate
  (IIIC): 1,2-diethyl-1,2-difluoroethylene carbonate
Component (IV)
  (IVA): Monofluoroethylene carbonate
  (IVB): 1,1-difluoroethylene carbonate
Electrolyte Salt (V)
  (VA): LiPF$_6$
  (VB): LiN(O$_2$SCF$_3$)$_2$
  (VC): LiN(O$_2$SC$_2$F$_5$)$_2$
  (VD): LiBF$_4$ NMR and IR measurements are carried in the manner mentioned below.
(1) NMR
Equipment: AC-300 available from BRUKER
Measuring Conditions:
  $^{19}$F-NMR: 282 MHz (trifluoromethylbenzene=−62.3 ppm)

¹H-NMR: 300 MHz (trifluoromethylbenzene=7.51 ppm)

(2) Infrared Spectroscopic Analysis (IR)

Measurement is carried out at room temperature with Fourier-transform infrared spectrophotometer 1760X available from Perkin Elmer Co., Ltd.

Synthesis Example 1

Synthesis of 1,2-Dimethyl-1,2-Difluoroethylene Carbonate

Reaction was carried out using a 3-liter SUS stainless steel autoclave. Into a reactor were added 2,3-butanedion (300 g, 3.48 mol) of the formula:

pyridine (138 g, 1.74 mol) and dichloromethane (1 liter), followed by stirring. Then, carbonyl difluoride of the formula:

was introduced at room temperature at 0.1 to 0.5 MPa. It was confirmed that the reaction was followed by heat generation up to 46.2° C. Thereafter, introduction of carbonyl difluoride was continued until heat generation and decrease of pressure could not be recognized, and proceeding of the reaction was traced with GC. After confirming that 2,3-butanedion as the starting material had disappeared, the reaction was terminated. After completion of the reaction, carbonyl difluoride remaining in the system was purged and then the following post-treatment was carried out. First, the reaction solution was subjected to quenching several times with 1-liter of pure water. Then, an organic layer of the bottom layer was collected and was subjected to to quenching again with 1 liter of 1N HCl solution to remove the remaining pyridine. After the quenching, drying was conducted with $MgSO_4$ and the filtrated solution was condensed with an evaporator. In this case, trans-form of the formula:

and cis-form of the formula:

had been produced, and a ratio of trans-form:cis-form was 76:24 (mole %).

This condensed product was subjected to refining with a five-staged Oldershaw type rectifier (Oldershaw column available from Sigma Ardrich).

As a result, the trans-form was obtained at a purity of 99.1% (yield: 60%) as fraction of distillate at 35° C. (3 mmHg), and the cis-form was obtained at a purity of 99.6% (yield: 20%) as fraction of distillate at 52° C. (2 mmHg).

According to NMR and IR analyses of these compounds, it was confirmed from the following identification data that the compounds were trans-form and cis-form, respectively of 1,2-dimethyl-1,2-difluoroethylene carbonate.

Trans-Form:

¹H-NMR (heavy acetone): 1.81 to 2.00 (m:6H)

¹⁹F-NMR (heavy acetone): −194.7 to −194.5 (m:2F)

IR: 1853.8 cm⁻¹

Cis-Form:

¹H-NMR (heavy acetone): 1.81 to 2.00 (m:6H)

¹⁹F-NMR (heavy acetone): −113.9 to −112.4 (m:2F)

IR: 1853.8 cm⁻¹

Synthesis Example 2

Synthesis of 1,2-Diethyl-1,2-Difluoroethylene Carbonate

Reaction was carried out using a 3-liter SUS stainless steel autoclave. Into a reactor were added 3,4-hexanedion (397 g, 3.48 mol) of the formula:

pyridine (138 g, 1.74 mol) and dichloromethane (1 liter), followed by stirring. Then, carbonyl difluoride of the formula:

was introduced at room temperature at 0.1 to 0.5 MPa. It was confirmed that the reaction was followed by heat generation up to 46.2° C. Thereafter, introduction of carbonyl difluoride was continued until heat generation and decrease of pressure could not be recognized, and proceeding of the reaction was traced with GC. After confirming that 3,4-hexanedion as the starting material had disappeared, the reaction was terminated. After completion of the reaction, carbonyl difluoride remaining in the system was purged and then the following post-treatment was carried out. First, the reaction solution was subjected to quenching several times with 1-liter of pure water. Then, an organic layer of the bottom layer was collected and was subjected to quenching again with 1 liter of 1N HCl solution to remove the remaining pyridine. After the quenching, drying was conducted with $MgSO_4$ and the filtrated solution was condensed with an evaporator.

In this case, trans-form of the formula:

and cis-form of the formula:

had been produced, and a ratio of trans-form:cis-form was 85:15 (mole %).

This condensed product was subjected to refining with a five-staged Oldershaw type rectifier (Oldershaw column available from Sigma Ardrich).

As a result, the trans-form was obtained at a purity of 99.1% (yield: 70%) as fraction of distillate at 50° C. (3 mmHg), and the cis-form was obtained at a purity of 99.6% (yield: 18%) as fraction of distillate at 70° C. (2 mmHg).

According to NMR and IR analyses of these compounds, it was confirmed from the following identification data that the compounds were trans-form and cis-form, respectively of 1,2-diethyl-1,2-difluoroethylene carbonate.

Trans-Form:
$^1$H-NMR (heavy acetone): 0.91 to 0.97 (m:6H), 1.61 to 1.85 (m:4H)
$^{19}$F-NMR (heavy acetone): −194.7 to −194.5 (m:2F)
IR: 1853.8 cm$^{-1}$ Cis-Form:
$^1$H-NMR (heavy acetone): 0.91 to 0.97 (m:6H), 1.61 to 1.85 (m:6H)
$^{19}$F-NMR (heavy acetone): −113.9 to −112.4 (m:2F)
IR: 1853.8 cm$^{-1}$

Example 1

Ethylene carbonate (IA) as the component (I), dimethyl carbonate (IIA) as the component (II) and cis-1,2-dimethyl-1,2-difluoroethylene carbonate (IIIA) as the component (III) were mixed in a volume % ratio of 30/67/3, and to this solvent for dissolving an electrolyte salt was added LiPF$_6$ as an electrolyte salt at a concentration of 1.0 mole/liter, followed by sufficiently stirring at 25° C. to prepare a non-aqueous electrolytic solution of the present invention.

Example 2

A non-aqueous electrolytic solution of the present invention was prepared in the same manner as in Example 1 except that trans-1,2-dimethyl-1,2-difluoroethylene carbonate (IIIB) was used as the component (III).

Comparative Example 1

A comparative non-aqueous electrolytic solution was prepared in the same manner as in Example 1 except that 30% by volume of ethylene carbonate (IA) was used as the component (I), 70% by volume of diethyl carbonate (IIC) was used as the component (II), and the component (III) was not added.

Comparative Example 2

A comparative non-aqueous electrolytic solution was prepared in the same manner as in Example 1 except that 30% by volume of ethylene carbonate (IA) was used as the component (I), 67% by volume of diethyl carbonate (IIC) was used as the component (II), 3% by volume of monofluoroethylene carbonate (IVA) was used as the component (IV) and the component (III) was not added.

Comparative Example 3

A comparative non-aqueous electrolytic solution was prepared in the same manner as in Example 1 except that 30% by volume of ethylene carbonate (IA) was used as the component (I), 67% by volume of diethyl carbonate (IIC) was used as the component (II), 3% by volume of 1,1-difluoroethylene carbonate (IVB) was used as the component (IV) and the component (III) was not added.

The following Test 1 was carried out using these non-aqueous electrolytic solutions.

Test 1 (Measurement of Internal Impedance)
(Preparation of Bipolar Cell)

An active material for a positive electrode prepared by mixing LiCoO$_2$, carbon black and polyvinylidene fluoride (trade name KF-1000 available from KUREHA CORPORATION) in a ratio of 90/3/7 (mass percent ratio) was dispersed in N-methyl-2-pyrrolidone to be formed into a slurry which was then uniformly coated on a positive electrode current collector (15 μm thick aluminum foil) and dried to form a layer made of a mixture of positive electrode materials. Then, the coated aluminum foil was subjected to compression molding with a roller press, and after cutting, a lead wire was welded thereto to prepare a strip-like positive electrode.

Separately, a styrene-butadiene rubber dispersed in distilled water was added to artificial graphite powder (trade name MAG-D available from Hitachi Chemical Co., Ltd.) to give a solid content of 6% by mass, followed by mixing with a disperser to be formed into a slurry which was then uniformly coated on a negative electrode current collector (10 μm thick copper foil) and dried to form a layer made of a mixture of negative electrode materials. Then, the coated copper foil was subjected to compression molding with a roller press, and after cutting and drying, a lead wire was welded thereto to prepare a strip-like negative electrode.

Figure 1:
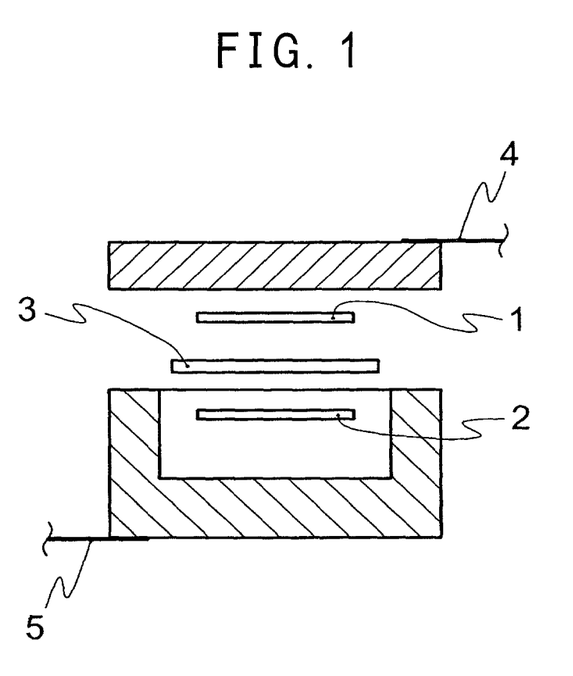
FIG. 1 is a diagrammatic longitudinal cross-sectional view of the bipolar cell prepared in Test 1.

The above strip-like positive electrode and negative electrode were cut into a size of 16 mm diameter, and a 20 μm thick microporous polyethylene film was cut into a size of 25 mm diameter to make a separator. These were combined and set as shown in a diagrammatic longitudinal cross-sectional view of FIG. 1 to make a bipolar cell. In FIG. 1, numeral 1 is a positive electrode; numeral 2 is a negative electrode; numeral 3 is a separator; numeral 4 is a positive electrode terminal; and numeral 5 is a negative electrode terminal. Then, 2 ml each of the electrolytic solutions prepared in Examples 1 to 2 and Comparative Examples 1 to 3 was put in this cell, and the cell was sealed. A capacity of the cell was 3 mAh. After the electrolytic solution had been sufficiently penetrated in the separator, etc., chemical conversion treatment was carried out to make a bipolar cell.

(AC Impedance Method)

In measurement of AC impedance, the bipolar cell was charged (SOC=100%) at 1.0 C at 4.2 V until a charging current reached 1/10 C. Then, an internal impedance of the cell was measured with a frequency analyzer (model 1260 available from Solartron Public Company Limited) and a potentio/galvanostat (model 1287 available from Solartron Public Company Limited). Measuring conditions were such that amplitude was ±10 mV and frequency was from 0.1 Hz to 2 kHz.

The obtained measured internal impedance was plotted. A real part (Re Z) and an imaginary part (Im Z) of the internal impedance value (Ω) were plotted on an X-axis and a Y-axis, respectively of a graph to make Cole-Cole plot which was as shown in FIG. 2.

Figure 2:
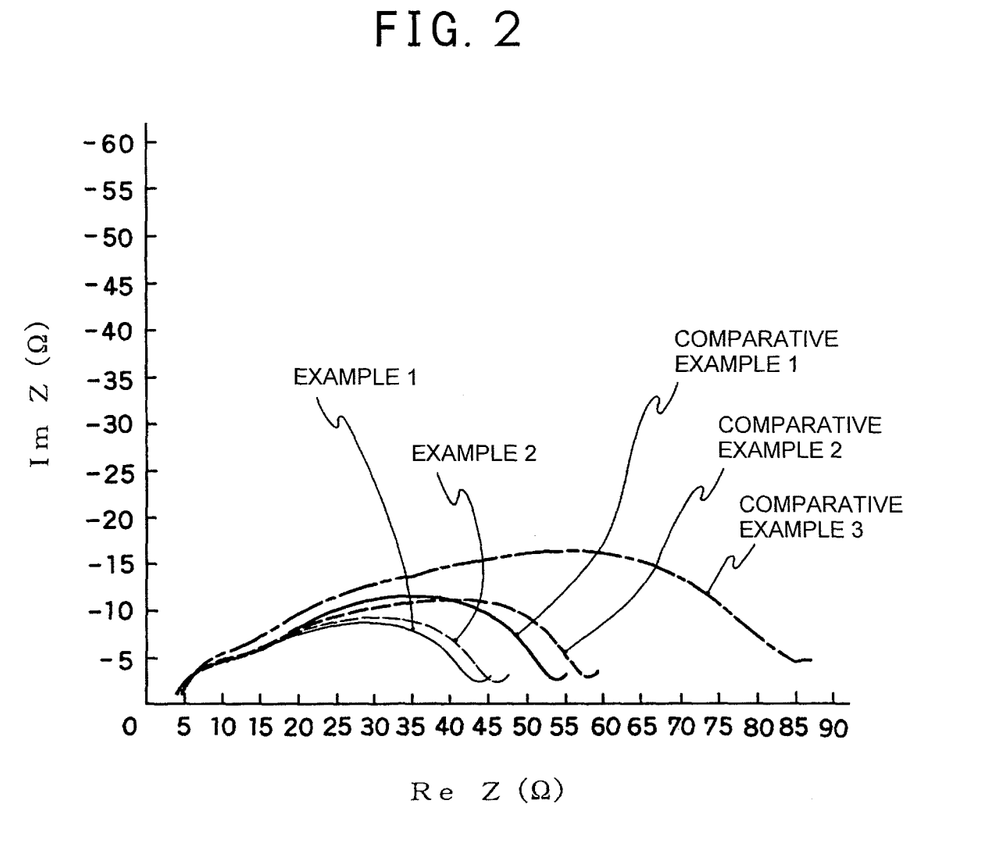
FIG. 2 is a graph of Cole-Cole plot of internal impedance measured in Test 1. It is seen that semi-circular parts of Examples 1 and 2 are small and resistance is small.

From the results shown in FIG. 2, it is seen that semicircular parts of the bipolar cells of Examples 1 and 2 are smaller than semi-circular parts of the bipolar cells of Comparative Examples 1 to 3, which indicates that resistance is small.

Test 2 (Measurement of Calorific Value)

Figure 3:
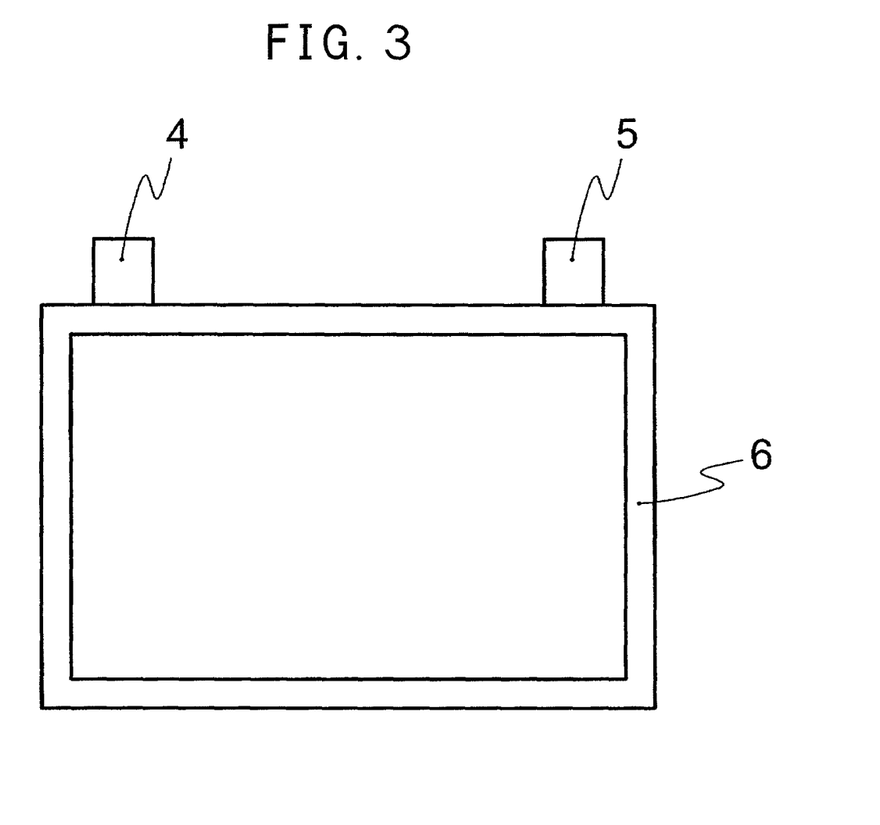
FIG. 3 is a diagrammatic plan view of the laminated cell prepared in Test 2.

As shown in the diagrammatic plan view of FIG. 3, the above strip-like positive electrode was cut into a size of 40 mm×72 mm (with a 10 mm×10 mm positive electrode terminal), and the above strip-like negative electrode was cut into a size of 42 mm×74 mm (with a 10 mm×10 mm negative electrode terminal). A lead wire was welded to each terminal. A 20 μm thick microporous polyethylene film was cut into a size of 78 mm×46 mm to make a separator, and the positive electrode and negative electrode were set so as to interpose the separator between them. These were put in the aluminum-laminated casing 6 as shown in FIG. 3, and then 2 ml each of the electrolytic solutions prepared in Example 1 and Comparative Example 1 was poured into the casing 6, followed by sealing to make a laminated cell having a capacity of 72 mAh.

Charge/discharge cycle was such that charging of the cell was continued at 1.0 C at 4.2 V until a charging current reached 1/10 C, discharging was continued at a current equivalent to 0.2 C until 3.0 V was reached, and subsequently, charging of the cell was continued at 1.0 C at 4.2 V until a charging current reached 1/10 C.

After charging and discharging, the laminated cell was disassembled in a glow box, and the positive electrode was taken out. The positive electrode and 0.5 ml of the electrolytic solution of Example 1 or Comparative Example 1 were put in a cell for measurement of calorific value to make a calorific value measuring cell.

The calorific value measuring cell was set on a calorimeter C80 available from Setaram Instrumentation, and the cell was heated up from 100° C. to 250° C. at a temperature elevating rate of 0.5° C./min to measure calorific value. The results are shown in FIG. 4.

Figure 4:
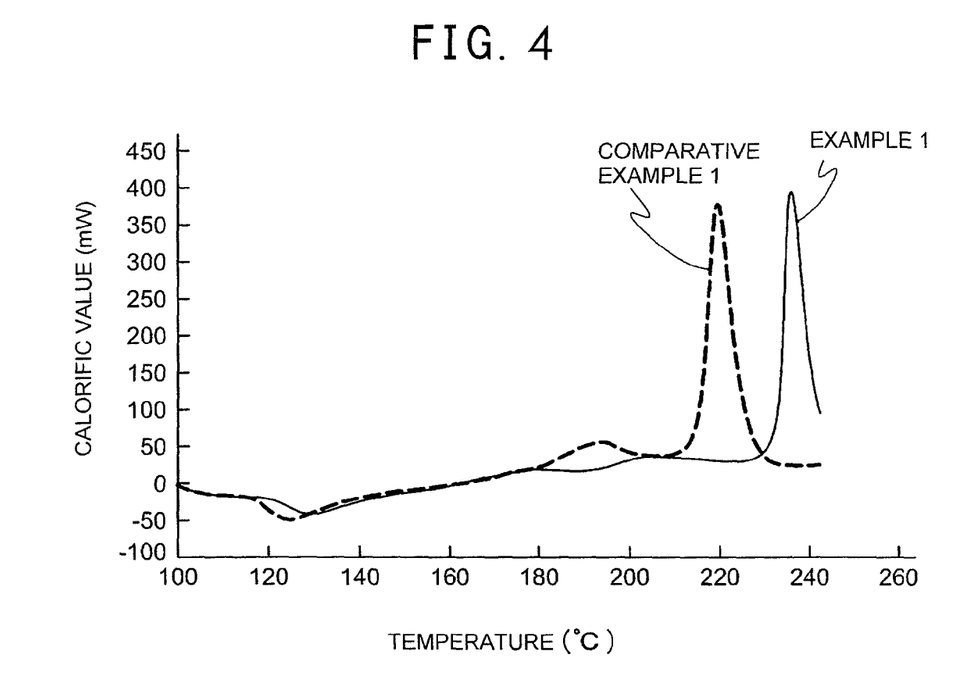
FIG. 4 is a graph showing a relation between temperature (° C.) and calorific value (heat flow: mW) measured in Test 2. It is seen that the heat generation starting temperature of Example 1 is higher.

From the results shown in FIG. 4, when comparing the electrolytic solution of Example 1 with the electrolytic solution of Comparative Example 1, it is seen that the electrolytic solution of Example 1 is safe since its heat generation starting temperature is higher and the total calorific value is decreased.

Examples 3 to 9

Non-aqueous electrolytic solutions of the present invention were prepared in the same manner as in Example 1 except that kinds and amounts of the component (I), component (II) and component (III) shown in Table 1 were used.

Test 3 (Measurement of Battery Characteristics)

A cylindrical secondary battery was made by the following method.

The strip-like positive electrode made in Test 1 was placed on the strip-like negative electrode made in Test 1 with a 20 μm thick microporous polyethylene film (separator) being interposed between them, followed by winding spirally to make a laminated electrode of spiral-wound structure. In this case, winding was carried out so that the rough surface of the positive electrode current collector faces outward. After this, the laminated electrode was put in a cylindrical bottomed battery case having an outer diameter of 18 mm, and welding of lead wires for the positive electrode and negative electrode was carried out.

Then, electrolytic solutions prepared in Examples 1 to 9 and Comparative Examples 1 to 3 were poured into the battery case, and after the electrolytic solution had been sufficiently penetrated in the separator, etc., sealing of the case, pre-charging and aging were carried out to make cylindrical lithium secondary batteries.

Discharge capacity, rate characteristic and cycle characteristic of this lithium secondary battery were measured. The results are shown in Table 1.

(Discharge Capacity)

When a charge/discharging current is represented by C and 1 C is assumed to be 1,800 mA, discharge capacity is measured under the following charge/discharge measuring conditions. Discharge capacity is indicated by an index, assuming the discharge capacity of Comparative Example 1 to be 100.

Charge and Discharge Conditions

Charging: Charging is continued at 1.0 C at 4.2 V until a charging current reaches 1/10 C(CC·CV charge).

Discharging: 1 C, 3.0 V cut (CC discharge)

(Rate Characteristic)

Charging is continued at 1.0 C at 4.2 V until a charging current reaches 1/10 C, and discharging is continued at a current equivalent to 0.2 C until 3.0 V is reached, and then discharge capacity is determined. Subsequently, charging is continued at 1.0 C at 4.2 V until a charging current reaches 1/10 C, and discharging is continued at a current equivalent to 2 C until 3.0 V is reached, and then discharge capacity is determined. The discharge capacity at 2 C and the discharge capacity at 0.2 C are substituted in the following equation to obtain rate characteristic.

$$\text{Rate characteristic (\%)} = \text{Discharge capacity (mAh) at 2 C/Discharge capacity (mAh) at 0.2 C} \times 100$$

(Cycle Characteristic)

Charge and discharge cycle to be conducted under the above-mentioned charge and discharge conditions (Charging is continued at 1.0 C at 4.2 V until a charging current reaches 1/10 C, and discharging is continued at a current equivalent to 1 C until 3.0 V is reached) is assumed to be one cycle, and discharge capacity after the first cycle and discharge capacity after the hundredth cycle are measured. Cycle characteristic is represented by a cycle maintenance factor obtained by the following equation.

$$\text{Cycle maintenance factor (\%)} = \text{Discharge capacity (mAh) after the hundredth cycle/Discharge capacity (mAh) after the first cycle} \times 100$$

(Over-Charge Test)

The cylindrical batteries of Examples 1 to 9 and Comparative Examples 1 to 3 are discharged at a current equivalent to 1 CmA until 3.0 V is reached, and over-charging is carried out at a current equivalent to 1 CmA up to an upper limit voltage of 12 V, and whether or not firing or bursting occurs is examined. When firing or bursting occurs, it is shown by X, and when neither firing nor bursting occurs, it is shown by ○.

TABLE 1

| | Example | | | | | |
|---|---|---|---|---|---|---|
| | 1 | 2 | 3 | 4 | 5 | 6 |
| Electrolytic solution | | | | | | |
| Solvent components | | | | | | |
| Component (I) | | | | | | |
| Kind | IA | IA | IA | IA | IA | IA + IB |
| Proportion (volume %) | 30 | 30 | 30 | 30 | 30 | 20 + 10 |
| Component (II) | | | | | | |
| Kind | IIA | IIA | IIB | IIB | IIC | IIA |
| Proportion (volume %) | 67 | 67 | 67 | 67 | 67 | 67 |
| Component (III) | | | | | | |
| Kind | IIIA | IIIB | IIIC | IIIA | IIIA | IIIA |
| Proportion (volume %) | 3 | 3 | 3 | 3 | 3 | 3 |
| Component (IV) | | | | | | |
| Kind | — | — | — | — | — | — |
| Proportion (volume %) | — | — | — | — | — | — |
| Electrolyte salt (concentration: mole/liter) | | | | | | |
| $LiPF_6$ | 1.0 | 1.0 | 1.0 | 1.0 | 1.0 | 1.0 |
| Discharge capacity (index) | 110.0 | 105.0 | 103.0 | 109.0 | 104.0 | 109.0 |
| Rate characteristic (%) | 97.3 | 95.0 | 96.5 | 96.6 | 96.0 | 96.8 |
| Cycle characteristic (%) | 92.0 | 90.5 | 91.5 | 93.0 | 93.5 | 91.5 |
| Overcharge test | ◯ | ◯ | ◯ | ◯ | ◯ | ◯ |

| | Example | | | Comparative Example | | |
|---|---|---|---|---|---|---|
| | 7 | 8 | 9 | 1 | 2 | 3 |
| Electrolytic solution | | | | | | |
| Solvent components | | | | | | |
| Component (I) | | | | | | |
| Kind | IA | IA | IA | IA | IA | IA |
| Proportion (volume %) | 30 | 30 | 30 | 30 | 30 | 30 |
| Component (II) | | | | | | |
| Kind | IIA + IIB | IIA + IIC | IIB + IIC | IIC | IIC | IIC |
| Proportion (volume %) | 30 + 37 | 30 + 37 | 30 + 37 | 70 | 67 | 67 |
| Component (III) | | | | | | |
| Kind | IIIA | IIIA | IIIA | — | — | — |
| Proportion (volume %) | 3 | 3 | 3 | — | — | — |
| Component (IV) | | | | | | |
| Kind | — | — | — | — | IVA | IVB |
| Proportion (volume %) | — | — | — | — | 3 | 3 |
| Electrolyte salt (concentration: mole/liter) | | | | | | |
| $LiPF_6$ | 1.0 | 1.0 | 1.0 | 1.0 | 1.0 | 1.0 |
| Discharge capacity (index) | 106.0 | 105.0 | 103.0 | 100.0 | 96.0 | 92.0 |
| Rate characteristic (%) | 97.0 | 96.5 | 96.3 | 90.8 | 89.3 | 75.0 |
| Cycle characteristic (%) | 92.5 | 93.2 | 93.1 | 82.5 | 86.0 | 81.0 |
| Overcharge test | ◯ | ◯ | ◯ | X | X | X |

From the results shown in Table 1, it is seen that discharge capacity, rate characteristic and cycle characteristic of the battery using 1,2-dimethyl-1,2-difluoroethylene carbonate are enhanced as compared with the battery of Comparative Example 1 which does not use 1,2-dimethyl-1,2-difluoroethylene carbonate. It is also seen that an effect of enhancing discharge capacity, rate characteristic and cycle characteristic is larger than the battery of Comparative Example 2 using monofluoroethylene carbonate and the battery of Comparative Example 3 using difluoroethylene carbonate.

Further, when comparing the use of trans-1,2-dimethyl-1,2-difluoroethylene carbonate (Example 2) with the use of cis-1,2-dimethyl-1,2-difluoroethylene carbonate (Example 1), it is seen that the use of cis-1,2-dimethyl-1,2-difluoroethylene carbonate (Example 1) exhibits a larger effect of enhancing discharge capacity, rate characteristic and cycle characteristic.

Also, it is seen that safety in the over-charge test is increased in the case of the battery using cis-1,2-dimethyl-1,2-difluoroethylene carbonate.

Examples 10 to 14

Non-aqueous electrolytic solutions of the present invention were prepared in the same manner as in Example 1 except that $LiN(O_2SCF_3)_2$ (VB) (Example 10), $LiN(O_2SC_2F_5)_2$ (VC) (Example 11) and $LiBF_4$ (VD) (Examples 12 to 14) were used as an electrolyte salt instead of $LiPF_6$ (VA), and kinds and amounts of the component (I), component (II) and component (III) shown in Table 2 were used.

The above-mentioned Test 3 was carried out using these non-aqueous electrolytic solutions. The results are shown in Table 2.

TABLE 2

|  | Example | | | | |
| --- | --- | --- | --- | --- | --- |
|  | 10 | 11 | 12 | 13 | 14 |
| Electrolytic solution | | | | | |
| Solvent components | | | | | |
| Component (I) | | | | | |
| Kind | IA | IA | IA | IA | IA |
| Proportion (volume %) | 30 | 30 | 30 | 30 | 11 |
| Component (II) | | | | | |
| Kind | IIA | IIA | IIA | IIA | IIA |
| Proportion (volume %) | 67 | 67 | 67 | 69.5 | 60 |
| Component (III) | | | | | |
| Kind | IIIA | IIIA | IIIA | IIIA | IIIA |
| Proportion (volume %) | 3 | 3 | 3 | 0.5 | 29 |
| Electrolyte salt (concentration: mole/liter) | | | | | |
| $LiN(O_2SCF_3)_2$ | 1.0 | — | — | — | — |
| $LiN(O_2SC_2F_5)_2$ | — | 1.0 | — | — | — |
| $LiBF_4$ | — | — | 1.0 | 1.0 | 1.0 |
| Discharge capacity (index) | 107.0 | 106.0 | 102.0 | 100.5 | 102.0 |
| Rate characteristic (%) | 95.9 | 96.1 | 96.0 | 91.5 | 94.5 |
| Cycle characteristic (%) | 91.0 | 90.7 | 90.0 | 83.0 | 86.0 |
| Overcharge test | ○ | ○ | ○ | ○ | ○ |

From the results shown in Table 2, it is seen that a large effect of enhancing discharge capacity, rate characteristic and cycle characteristic of the battery is exhibited when using 1,2-dimethyl-1,2-difluoroethylene carbonate even if an electrolyte salt is changed. Further, it is seen that in the case of decreasing the amount of 1,2-dimethyl-1,2-difluoroethylene carbonate to 0.5% by volume and in the case of increasing the amount of 1,2-dimethyl-1,2-difluoroethylene carbonate to 29% by volume, discharge capacity, rate characteristic and cycle characteristic are lowered, but are larger as compared with Comparative Example 1.

Also, it is seen that safety in the over-charge test is increased in the case of the battery using cis-1,2-dimethyl-1,2-difluoroethylene carbonate.

INDUSTRIAL APPLICABILITY

According to the present invention, by using 1,2-dialkyl-1,2-difluoroethylene carbonate (III) which is hardly hydrolyzed particularly, non-fluorine-containing cyclic carbonate (I) and non-fluorine-containing chain carbonate (II) in a specific ratio, there is provided a solvent for a non-aqueous electrolytic solution which provides a lithium secondary battery being excellent particularly in discharge capacity, rate characteristic, cycle characteristic and safety. Also, there are provided an electrolytic solution using the above-mentioned solvent and a lithium secondary battery.

The invention claimed is:

1. A solvent for non-aqueous electrolytic solution of lithium secondary battery comprising
a non-fluorine-containing cyclic carbonate (I),
a non-fluorine-containing chain carbonate (II) and 1,2-dialkyl-1,2-difluoroethylene carbonate (III),
wherein the non-fluorine-containing cyclic carbonate (I) is at least one selected from the group consisting of ethylene carbonate, propylene carbonate, butylene carbonate and vinylene carbonate,
wherein the non-fluorine-containing chain carbonate (II) is at least one selected from the group consisting of diethyl carbonate, methyl ethyl carbonate, dimethyl carbonate and methyl propyl carbonate;
wherein the 1,2-dialkyl-1,2-difluoroethylene carbonate (III) is at least one selected from the group consisting of 1,2-dimethyl-1,2-difluoroethylene carbonate, 1,2-diethyl-1,2-difluoroethylene carbonate and 1-methyl-2-ethyl-1,2-difluoroethylene carbonate, and
wherein when the total amount of (I), (II) and (III) is taken as 100% by volume,
the non-fluorine-containing cyclic carbonate (I) is contained in an amount of 10 to 50% by volume,
the non-fluorine-containing chain carbonate (II) is contained in an amount of 49.5 to 89.5% by volume, and
the 1,2-dialkyl-1,2-difluoroethylene carbonate (III) is contained in an amount of not less than 0.5% by volume and less than 30% by volume.

2. The solvent for non-aqueous electrolytic solution of claim 1, wherein the non-fluorine-containing cyclic carbonate (I) is one of ethylene carbonate and propylene carbonate or a mixture thereof.

3. The solvent for non-aqueous electrolytic solution of claim 1, wherein the non-fluorine-containing chain carbonate (II) is one of dimethyl carbonate, methyl ethyl carbonate and diethyl carbonate or a mixture thereof.

4. The solvent for non-aqueous electrolytic solution of claim 1, wherein when the total amount of (I), (II) and (III) is taken as 100% by volume,
the non-fluorine-containing cyclic carbonate (I) is contained in an amount of 10 to 40% by volume,
the non-fluorine-containing chain carbonate (II) is contained in an amount of 59.5 to 89.5% by volume, and
the 1,2-dialkyl-1,2-difluoroethylene carbonate (III) is contained in an amount of not less than 0.5% by volume and less than 10% by volume.

5. The solvent for non-aqueous electrolytic solution of claim 1, wherein the 1,2-dialkyl-1,2-difluoroethylene carbonate (III) is 1,2-dimethyl-1,2-difluoroethylene carbonate.

6. The solvent for non-aqueous electrolytic solution of claim 5, wherein the 1,2-dimethyl-1,2-difluoroethylene carbonate (III) is cis-form.

7. The solvent for non-aqueous electrolytic solution of claim 5, wherein the 1,2-dimethyl-1,2-difluoroethylene carbonate (III) is trans-form.

8. A non-aqueous electrolytic solution of lithium secondary battery comprising the solvent for non-aqueous electrolytic solution of claim 1, and
an electrolyte salt.

9. A lithium secondary battery using the non-aqueous electrolytic solution of claim 8.

* * * * *